United States Patent [19]

Andersson

[11] Patent Number: 4,639,318
[45] Date of Patent: Jan. 27, 1987

[54] TUBULAR FILTER PRIMARILY INTENDED FOR FILTRATION OF LIQUIDS

[75] Inventor: Ralf G. Andersson, Ödakra, Sweden

[73] Assignee: Gullfiber AB, Billesholm, Sweden

[21] Appl. No.: 679,043

[22] PCT Filed: Mar. 8, 1984

[86] PCT No.: PCT/SE84/00085
§ 371 Date: Nov. 7, 1984
§ 102(e) Date: Nov. 7, 1984

[87] PCT Pub. No.: WO84/03450
PCT Pub. Date: Sep. 13, 1984

[30] Foreign Application Priority Data

Mar. 9, 1983 [SE] Sweden .............................. 8301282

[51] Int. Cl.[4] .................. B01D 27/00; B01D 39/14
[52] U.S. Cl. .............................. 210/491; 210/497.01
[58] Field of Search ................ 210/489, 491, 497.01

[56] References Cited

U.S. PATENT DOCUMENTS

| 2,320,990 | 6/1943 | White | 210/489 |
| 2,395,449 | 2/1946 | Briggs | 210/489 |
| 2,609,932 | 9/1952 | Fricke | 210/489 |
| 3,209,916 | 10/1965 | May et al. | 210/489 |
| 3,210,229 | 10/1965 | Feine | 210/489 |
| 3,334,752 | 8/1967 | Matravers | 210/489 |
| 4,187,136 | 2/1980 | Nostrand | 210/489 |

Primary Examiner—John Adee
Attorney, Agent, or Firm—Cushman, Darby & Cushman

[57] ABSTRACT

A tubular filter which is primarily intended for filtration of liquid flowing substantially radially towards the interior of the filter. The filter comprises two layers (10, 11) of mineral wool. An interior layer (10) has the fibres oriented substantially concentrically to the tube axis and an outer filter layer (11) of mineral wool has the fibres oriented substantially radially to the tube axis. The material of the tubular filter must be arranged so that its density increases from the outer portion of the tubular filter towards its inner portion.

10 Claims, 1 Drawing Figure

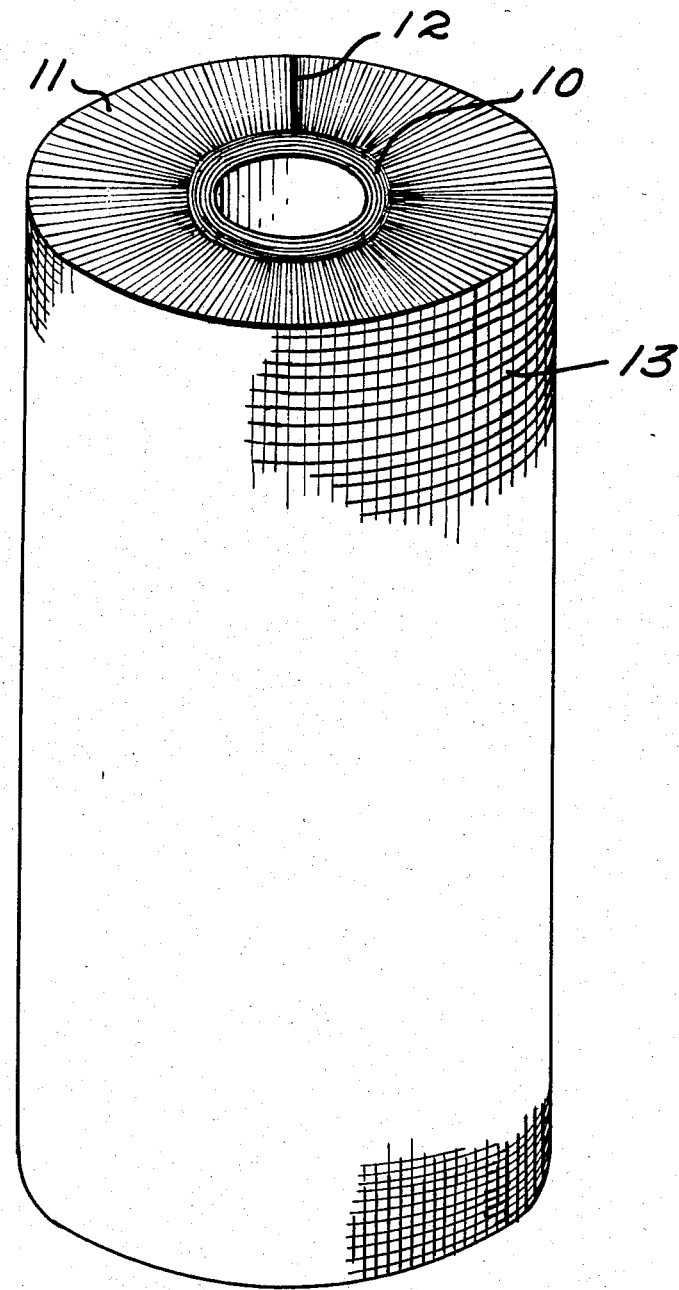

TUBULAR FILTER PRIMARILY INTENDED FOR FILTRATION OF LIQUIDS

This invention relates to a tubular filter primarily intended for filtration of liquids, the liquid flowing substantially radially towards the interior of the tubular filter.

I.a. in connection with separation of oil from water it is previously known to utilize so-called tube filters, which are composed of several layers of mineral wool. Thus, U.S. Pat. No. 3,210,229 describes as an example such a filter (cf. FIG. 1 in the patent) consisting of two inner layers of substantially radial fibre direction and an outer layer with fibres which are oriented substantially transversely to the direction of flow. The known filter is in the first place intended for use with a liquid passing radially outwards from the interior of the filter. The density of the filter will then decrease in each specific layer as seen in the direction of flow even if the density may increase from layer to layer.

It is now the object of the invention to provide a tubular filter of the type indicated above which has a good depth effect as well as good pressure indicating properties. The filter is to have a long life and should be especially suited for filtration of water which is to be used e.g. as drinking water or bath water. However, the use of the filter is by no means restricted to water but may also comprise other liquids and gases, also.

According to the invention the new filter is primarily characterized in that it comprises in combination an inner filter layer of mineral wool, the fibres of which are substantially concentrically oriented to the tube axis, and an outer filter layer of mineral wool, the fibres of which are oriented substantially radially to the tube axis. It is especially advantageous to arrange the material of the tubular filter in such a way that its density will increase from the outer portion of the tubular filter towards its inner portion, the increase being continuous in the outer mineral wool layer.

Tests have shown that a filter built according to the principles of the invention has a very good depth effect in the outer mineral wool layer which facilitates a rapid passing flow due to the radial fibrer orientation. As the material in the outer layer of the tubular filter has increasing density in inward direction big particles will get stuck more closely to the outside of the filter whereas finer particles will penetrate further into the filter and get stuck more closely to the inside of the outer layer or in the inner layer. Due to the fibre orientation in the inner layer the filter liquid will be braked and, moreover, redistributed peripherically to a certain extent, as it is more difficult for the liquid to penetrate into the inner layer. In this connection it can be worth mentioning that twice as great a flow per time unit is normally obtained through a layer in which the fibres are oriented in the direction of flow as through a layer in which the fibres are oriented transversely to the direction of flow, even if the layers have the same density. If the inner layer hos now a higher density than the outer one this will result in a not inessential pressure difference between the inner and outer portions of the filter. This pressure difference can be determined by means of conventional water pressure gauges which, thus, will show reference values in relation to the clogging of the filter. In this way an indication of the suitable time for replacement of the filter is obtained.

The invention will now be described more in detail below in the form of a preferred illustrative example with reference to the FIGURE disclosed on the drawing.

The tubular filter illustrated on the drawing comprises as main constituents two filter layers 10, 11 of mineral wool, which preferably consist of glass fibre.

The inner filter layer 10 has preferably a density of 40–100 kg/m$^3$, preferably 55–75 kg/m$^3$, and consists of a tube made from glass fibre. The fibres are preferably concentrically oriented relative to the longitudinal axis of the tube.

The outer filter layer 11 has preferably a density of 20–70 kg/m$^3$, preferably 30–50 kg/m$^3$, and is made from a glass fibre disc with the fibres oriented perpendicularly to the disc plane. This disc of mineral wool is built from a conventional glass fibre disc with fibres oriented parallelly with the disc plane, from which rods or strips of the intended length have been sawed. These rods or strips have been joined and glued together so that they form said disc with fibres oriented perpendicularly to the disc plane.

The glass fibre disc with fibres oriented perpendicularly to the disc plane is adapted to the previously described tube which was made from the disc with parallelly oriented fibres, the disc edges of the outer layer 11 facing each other being glued together (at 12). Thus, an outer filter layer 11 is obtained in which the density of the material increases towards the centre of the filter, the density $\rho_x$ in a layer at the distance x from the inner surface being determined by the density $\rho_o$ of the starting material according to the formula $$\rho_x = \rho_o (r_i + d / r_i + x)$$

wherein $r_i$ is the inner radius and d the difference between outer radius and inner radius, i.e. the thickness.

A binding layer 13 is glued onto the outside of the outer layer 11, which binding layer preferably consists of glass tissue. The binding layer 13 can be a mesh net, e.g. approximately 30 meshes per cm$^2$, and is illustrated only partially on the drawing.

In practical tests with tubular filters made according to the principles of the invention it has been found to be advantageous to select the ratio of the thickness of the inner layer to that of the outer one within the range of ⅓–1/50. The length of the tubular filter is not critical.

The tubular filter described above can be modified within the scope of the appended claims. Thus, it is e.g. possible to supplement the tubular filter construction described above with additional glass fibre layers having a radial and/or transverse fibre orientation.

I claim:

1. A tubular filter primarily intended for filtration of liquid flowing substantially radially towards the interior of the filter comprising in combination an inner filter layer of mineral wool, the fibres of which are oriented substantially concentrically to the tube axis, and an outer layer, of mineral wool, the fibres of which are oriented substantially radially to the tube axis, the density of the filter increasing from the outer surface of the outer layer to the inner surface of the inner layer, the increase being continuous in the outer layer.

2. A tubular filter as in claim 1 wherein the density of the inner layer of mineral wool is in the range 40–100 kg/m$^3$ and wherein the density of the outer layer of mineral wool is in the range 20–70 kg/m$^3$.

3. A tubular filter as in claim 2 wherein the density of the inner layer of mineral wool is in the range 55–75 kg/m$^3$ and wherein the density of the outer layer of mineral wool is in the range 30–50 kg/m$^3$.

4. A tubular filter as in claim 1 wherein the outer layer of mineral wool is formed from a disc composed of rods or strips of a starting disc with fibres oriented parallelly with the disc plane, said rods or strips being joined together.

5. A tubular filter as in claim 4 wherein the rods or strips are joined together with glue.

6. A tubular filter as in claim 1 wherein the ratio of the thickness of the inner layer of mineral wool to that of the outer layer is within the range ⅓–1/50.

7. A tubular filter as in claim 1 wherein the outer layer of mineral wool is covered by a binding layer.

8. A tubular filter as in claim 7 wherein the binding layer is a loose glass tissue.

9. A tubular filter as in claim 1 wherein the filter material is glass fibre.

10. A tubular filter through which liquid flows substantially radially toward the interior of the filter comprising inner and outer tubular layers of mineral wool, each layer being of circular cross-section and concentric with the axis of the filter, the fibers of the inner tubular layer being oriented substantially concentric to the filter axis and the fibers of the outer tubular layer being oriented substantially radial to the filter axis, the density of the filter increasing from the outer surface of the outer layer to the inner surface of the inner layer with the increase being continuous between the outer and inner surfaces of the outer layer, and the density of the mineral wool of the outer layer exceeding the density of the mineral wool of the inner layer by about 20 kg/m$^3$.

* * * * *